United States Patent [19]

Jones

[11] Patent Number: 4,759,325
[45] Date of Patent: Jul. 26, 1988

[54] ROTARY ENGINE COOLING SYSTEM

[75] Inventor: Charles Jones, Hillsdale, N.J.

[73] Assignee: Deere & Company, Moline, Ill.

[21] Appl. No.: 7,877

[22] Filed: Jan. 28, 1987

[51] Int. Cl.⁴ .............................. F02B 53/00
[52] U.S. Cl. ........................ 123/242; 418/83; 418/179
[58] Field of Search ............. 123/242; 418/83, 86, 418/178, 179

[56] References Cited

U.S. PATENT DOCUMENTS

| | | | |
|---|---|---|---|
| Re. 29,806 | 10/1978 | Iida et al. | 418/178 |
| 3,216,404 | 11/1965 | Peras | 123/242 X |
| 3,949,711 | 4/1976 | Shobert, III | 123/8.01 |
| 3,973,883 | 8/1976 | Walmsley et al. | 418/178 |
| 3,974,309 | 8/1976 | Uy | 427/250 |
| 3,995,602 | 12/1976 | Burley | 123/8.45 |
| 4,021,163 | 5/1977 | Morita et al. | 418/83 |
| 4,037,998 | 7/1977 | Goloff | 418/83 |
| 4,059,370 | 11/1977 | Gibson | 418/56 |
| 4,531,900 | 7/1985 | Jones et al. | 418/61 A |

Primary Examiner—Stephen F. Husar

[57] ABSTRACT

A rotary internal combustion engine has a rotor housing with drilled coolant passages extending generally axially therethrough, a thin wear-resistant liner lines the inner trochoid surface of the rotor housing. A ceramic insert may be used to insulate a top-dead-center region of the inner portion of the rotor housing. Some of the coolant passages may cross each other through a "V-crotch" portion of the housing between the spark plug and pilot injector bores.

17 Claims, 4 Drawing Sheets

ROTARY ENGINE COOLING SYSTEM

BACKGROUND OF THE INVENTION

The present invention relates to a rotary internal combustion engine and, in particular, to the cooling system therefore.

In conventional rotary internal combustion engines, a substantial amount of heat energy is absorbed by the coolant and then lost to the environment. It would be desirable to reduce the amount of heat rejected into the coolant with the result that more energy would be available in the exhaust for turbocharging or turbocompounding. Also, in conventional rotary engines, water coolant passages are cast into the engine housing. Casting techniques require that certain minimum wall thicknesses be maintained between adjacent voids. Conventional engines also typically have relatively large coolant passages. These large coolant passages must be enclosed by relatively large amounts of solid housing material. This increases engine weight and interferes with heat transfer to the coolant. With such large coolant passages, coolant flow velocity is low, with the result that oil or fuel cannot be used as the coolant. It would be desirable to have an engine with coolant passages which are smaller so that oil or fuel could be used as the coolant and so that the amount of solid housing material in the engine can be reduced.

SUMMARY OF THE INVENTION

An object of the present invention is to provide a rotary internal combustion engine wherein the amount of heat rejected to the coolant is reduced.

Another object of the present invention is to also provide such an engine with a coolant system which permits reduced engine weight while maintaining or improving the structural integrity of the engine.

Another object is to provide such a rotary engine with a cooling system which permits use of oil or fuel as the coolant fluid.

These and other objects are achieved by the present invention wherein a rotary internal combustion engine has a rotor housing through which extends a plurality of axial drilled coolant passages. These passages are arranged in arrays which are oriented close to and parallel with various rotor housing surfaces which are exposed to heat. A thin steel liner may be used to line the trochoidal surface of the rotor housing In a pair of embodiments, a ceramic insert is located in the top-dead-center region between the liner and the housing. This insert insulates the housing from the combustion heat and increases the amount of heat retained by the exhaust, with the result that more energy would be available in the exhaust for turbocharging or turbocompounding. In one of these embodiments, the injector and spark plug bores extend directly through the ceramic insert. In the other of these embodiments, sleeves of housing material extend through the insert and receive the injectors and spark plugs.

The spark plug bore and the pilot injector bore are separated by a "V-crotch" housing portion. In one embodiment, drilled coolant passages are directed through this "V-crotch" portion in a crossing manner so as to form an X-like pattern when viewed in a direction parallel to the axis of the spark plug bore. This increases the surface area of the coolant passages and enhances cooling of the "V-crotch" area.

DETAILED DESCRIPTION

A rotary internal combustion engine includes a rotor housing 10 with a top-dead-center (TDC) region. The inner wall of the housing 10 forms a trochoid surface 12 which surrounds the trochoid cavity 14. A conventional three-cornered rotor (not shown) rotates within the cavity 14. An optional thin liner 16 may be fixed to the inner surface 12. The liner 16 is preferably formed of a wear-resistant material, such as steel. Such a liner could be used with rotor housing materials such as aluminum. Aluminum does not have good high temperature strength, but is the material of choice for high output engines because of its high thermal conductivity.

Figure 1:
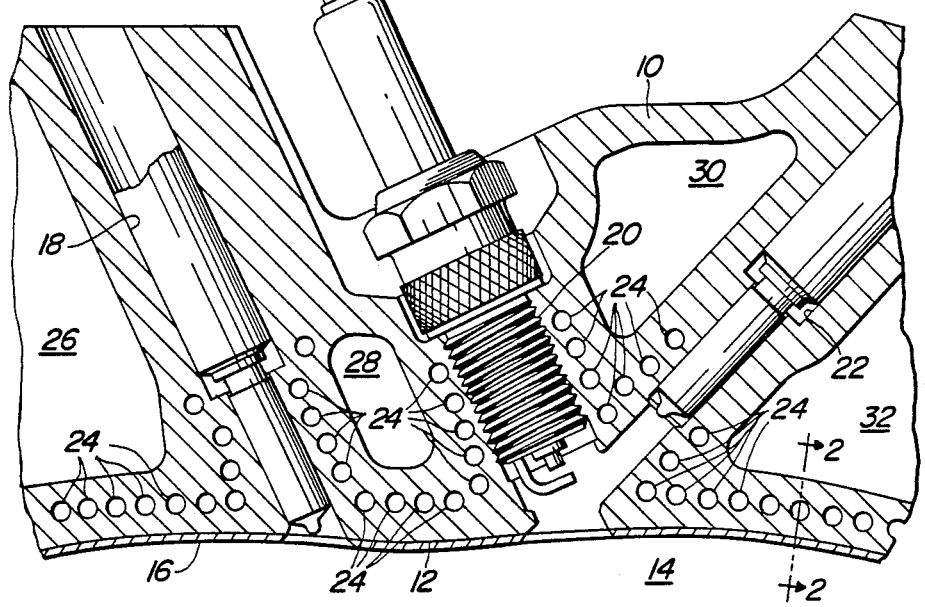
FIG. 1 is an axial end view of a top-dead-center region of a rotor housing constructed according to the present invention.
Figure 2:
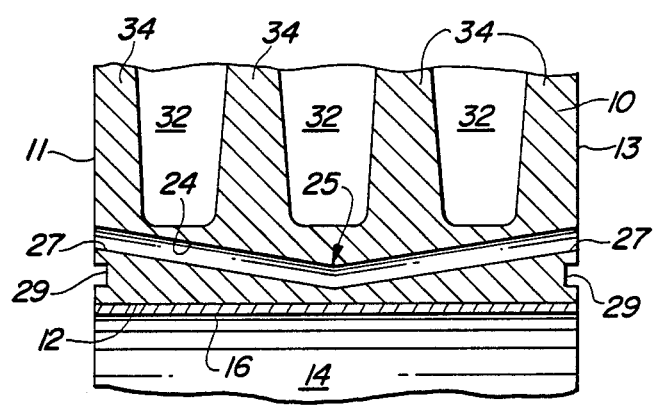
FIG. 2 is a view along lines 2—2 of FIG. 1

The embodiment shown in FIGS. 1 and 2 is particularly applicable to higher strength housing materials, such as cast iron, which have low thermal conductivity, and would therefore require coolant passages to be as close as possible to the heat input surface of the housing to avoid having the trochoid surface temperature exceed the limits for conventional seal lubricants. In such a case, no liner would be used.

A main injector bore 18, a spark plug bore 20 and a plot injector bore 22 all extend through solid portions of the housing and liner 16 and open into the cavity 14. A plurality of drilled coolant passages 24 extend axially through the solid portions in the housing 10. The passages 24 all extend perpendicular to the oppositely facing end walls 11 and 13 of the housing 10. The passages 24 are arranged in a number of arrays. As seen in FIG. 1, some of the arrays extend substantially parallel to the trochoid surface 12, while others of the passages 24 are arranged in arrays that extend generally parallel to the axis of the bores 18, 20 and 22 or at least generally parallel to various walls of these bores 18, 20 and 22. Since the passages 24 are drilled, rather than cast into the housing 10, they can be positioned to within 1 to 3 millimeters of the nearest machined surface such as the trochoid surface 12 or an adjacent coolant passage 24. With such drilled passages, metal can be removed from areas not required to enclose coolant passages and from areas not requiring structural support. Thus, the TDC region can include voids 26, 28, 30 and 32 of various shapes. As best seen in FIG. 2, the housing 10 can be formed with a plurality of radially extending ribs 34 which extend between the inner and outer portions of the housing 10. The space between these ribs 34 reduces the weight of the housing 10. Also, as best seen in FIG. 2, where appropriate, some of the passages 24 will be generally V-shaped with a center portion 25 radially inwardly of their axially outer ends 27. This leaves room for grooves 29 in end walls 11 and 13 which receive O-rings (not shown) for sealing between the rotor housing 10 and the end housings (not shown) which are attached to opposite sides of the rotor housing 10.

Figure 3:
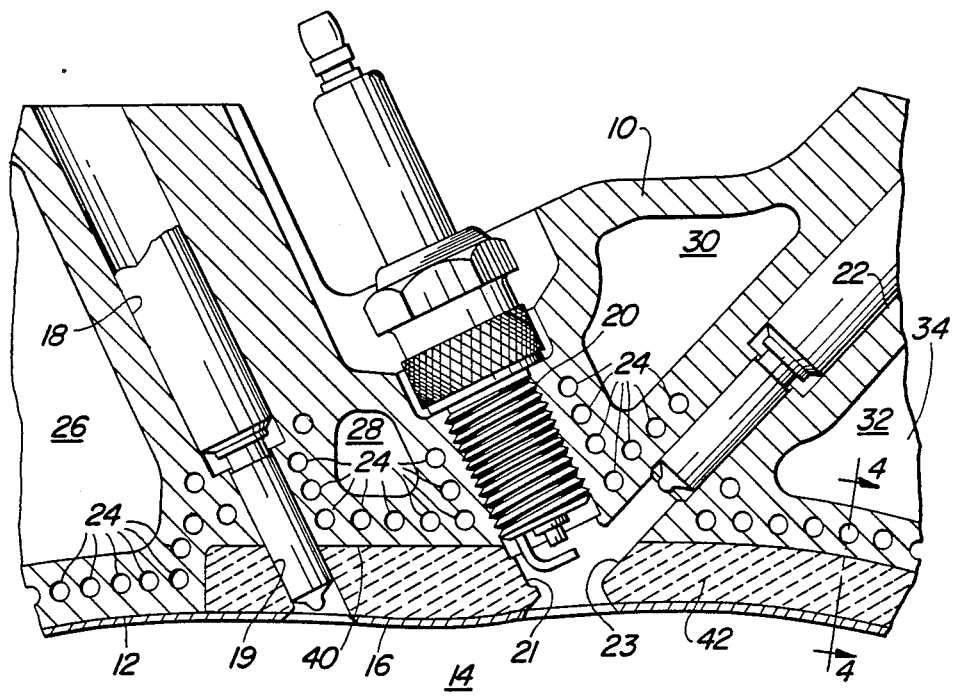
FIG. 3 is an axial end view of a top-dead-center region of a rotor housing constructed according to an alternate embodiment.
Figure 4:
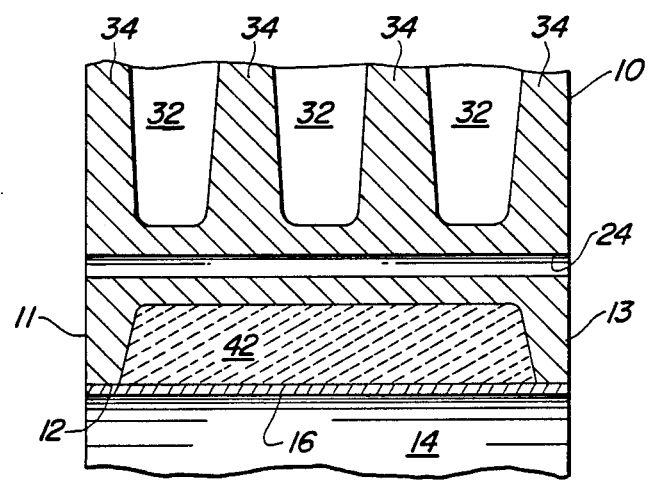
FIG. 4 is a view along lines 4—4 of FIG. 3.

FIG. 3 shows an alternative embodiment of the present invention wherein a recess 40 is formed in the inner surface of the housing 10. An insert 42 of insulating material, such as a ceramic or refractory material, is formed in the recess 40 to insulate the TDC region from the heat of combustion. The drilled coolant passages 24 are arranged in arrays which extend around the inner surface 44 of the insert 42 and which extend generally parallel to the axis of bores 18, 20 and 22. Preferably, although this feature is not shown, the insert 42 will extend about half way from the TDC region to the exhaust port (not shown). Also, in the embodiment of FIG. 3, extensions 19, 21, and 23 of bores 18, 20 and 22, respectively, extend directly through the insert 42.

Figure 5:
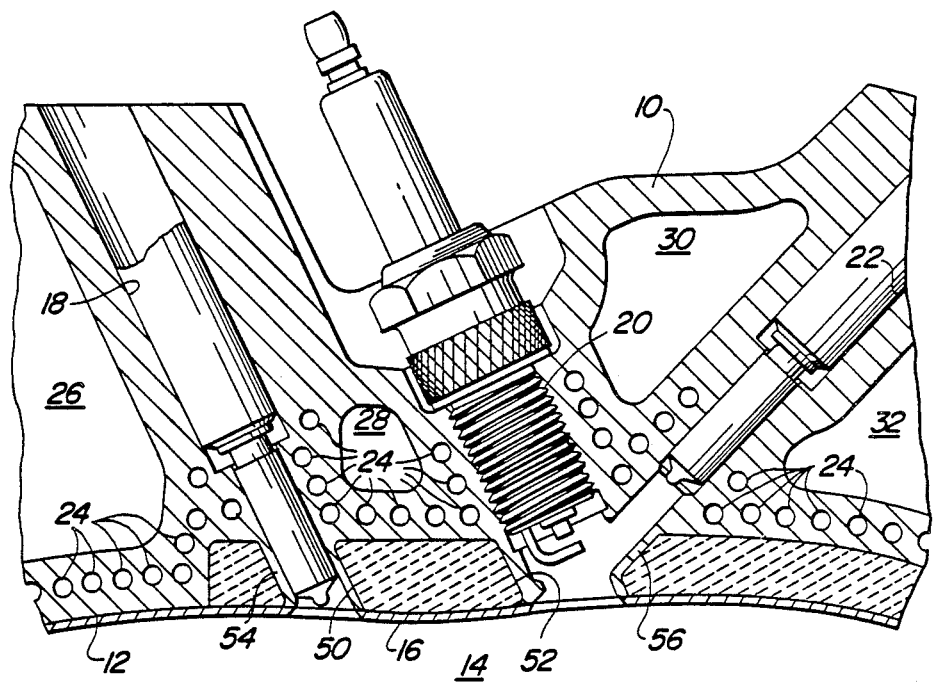
FIG. 5 is an axial end view of a top-dead-center region of a rotor housing constructed according to another alternative embodiment of the present invention.

FIG. 5 shows another alternative embodiment wherein insert 42 includes apertures 50 and 52. Aperture 50 receives a cylindrical sleeve 54 of the housing material which extends through the insert 42 and through which extends the bore 18. Aperture 52 receives a projection 56 of housing material which extends through insert 42 and through which extends the intersecting portions of bores 20 and 22.

Figure 6:
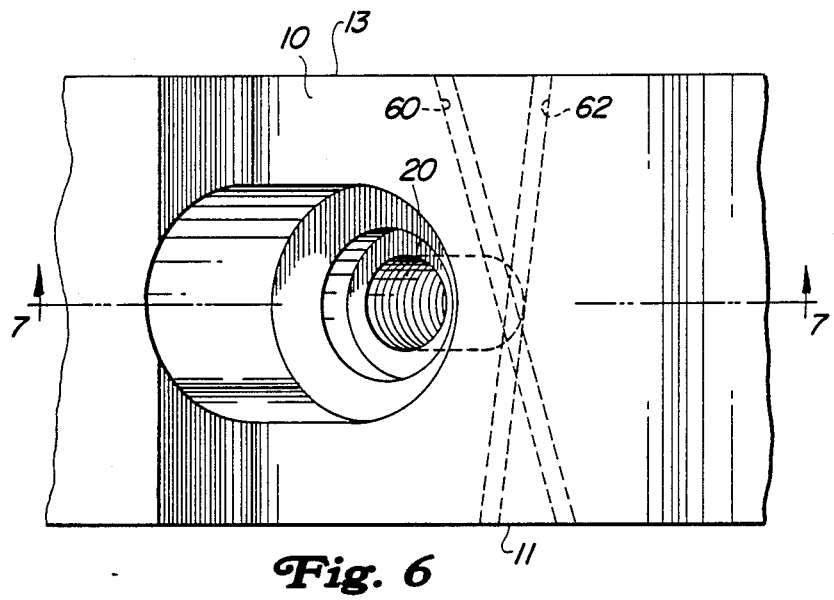
FIG. 6 is a radially inwardly directed view of a top-deadcenter region of another embodiment of the present invention.
Figure 7:
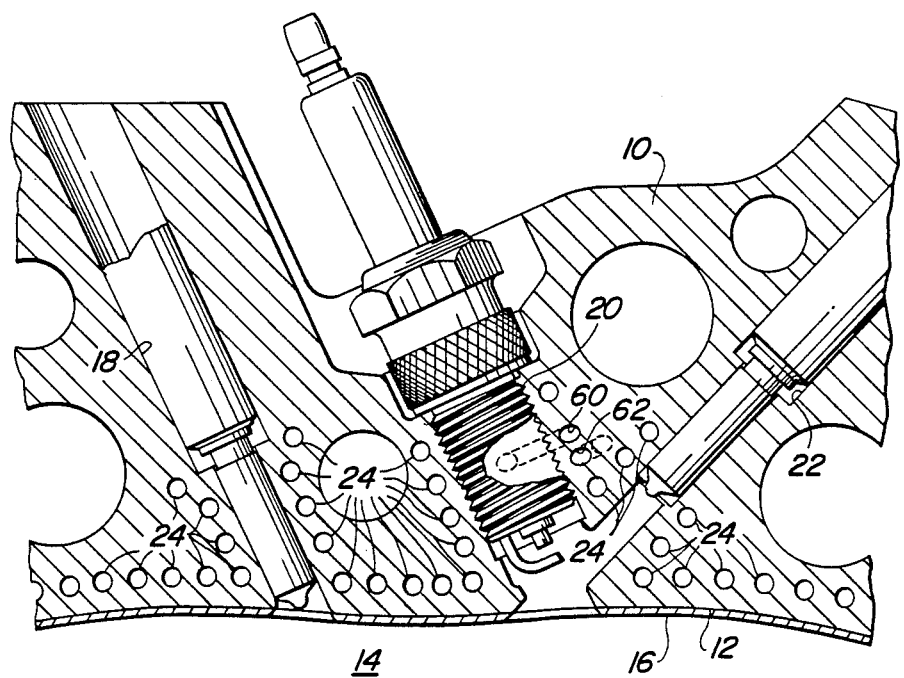
FIG. 7 is a view along lines 7—7 of FIG. 6.

FIGS. 6 and 7 show another alternative embodiment similar to that which is shown in FIG. 1, except that the embodiment of FIGS. 6 and 7 include a pair of drilled cooling passages 60 and 62 which are drilled at angles with respect to the other drilled passages 24. The passages 60 and 62 are also angled slightly with respect to each other so that they appear to cross in the "V-crotch" housing region between spark plug bore 20 and injector bore 22, when viewed in a radially inwardly direction as shown in FIG. 6. The passages 60 and 62 may also lie in planes which are perpendicular to the axis of the spark plug bore, as best seen in FIG. 7. Such passages 60 and 62 enhance the cooling in the "V-crotch" area because they provide more surface area for the coolant to contact the housing 10. Similar angled passages could be used on both sides of bores 18, 20 and 22, not just between bores 20 and 22.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

What is claimed:

1. A rotary internal combustion engine comprising:
a rotor housing forming a trochoidal cavity therein, the housing having a recess formed in a top-dead-center region of the engine and having a housing bore extending therethrough;
an insert of refractory material received in the recess, the insert having an insert bore extending therethrogh and communicating the housing bore with the cavity;
an element of a fuel injection and ignition system extending through the housing and insert bores, the element having an end exposed to the cavity; and
the housing having a plurality of cooling passages extending therethrough, the cooling passages being comprised of drilled holes.

2. The invention of claim 1, wherein:
at least some of the drilled holes are arranged in an array which extends parallel to an axis of the housing and insert bores.

3. The invention of claim 1, wherein:
at least some of the drilled holes are arranged in an array which extends generally parallel to a surface of the insert.

4. The invention of claim 1, wherein:
a wear-resistant liner covers radially inner surfaces of the housing and the insert.

5. The invention of claim 1, wherein:
a further bore extends through the housing and the insert, the further bore having an axis which intersects an axis of the first mentioned bore in the insert, said intersection being located interior to the insert.

6. A rotary internal combustion engine comprising:
a rotor housing forming a trochoidal cavity therein, the housing having a recess formed in a top-dead-center region of the engine, the housing having a sleeve member projecting into the recess and towards the cavity and having a bore extending through the housing and the sleeve and opening into the cavity;
an insert of refractory material received in the recess, the insert having a passage extending therethrough for receiving the sleeve; and
an element of a fuel injection and ignition system extending throught the bore, the element having an end exposed to the cavity; and
the housing having a plurality of cooling passages extending therethrough, the cooling passages being comprised of drilled holes.

7. The invention of claim 6, wherein:
at least some of the drilled holes are arranged in an array which extends generally parallel to an axis of the bore.

8. The invention of claim 6, wherein:
at least some of the drilled holes are arranges in an array which extends generally parallel to a surface of the insert.

9. The invention of claim 6, wherein:
a wear resistant liner covers radially inner surfaces of the housing and the insert.

10. The invention of claim 6, wherein:
a further bore extends through the housing, the further bore having an axis which intersects an axis of the first mentioned bore, said intersection being located interior to the insert.

11. In a rotary combustion engine with a housing having a trochoidal cavity therein, the housing having a plurality of cooling passages therein for receiving cooling fluid, the improvement wherein:
the coolant passages comprise a plurality of drilled holes extending through the housing;
a thin wear resistant liner lines the surface of the trochoidal cavity;
the housing has a recess formed in a top-dead-center region thereof, the recess opening towards the trochoidal cavity; and
an insert of refractory material is received in the recess, the liner extending over said recess and covering a radial inner surface of the insert.

12. The invention of claim 11, wherein
at least some of the plurality of drilled holes are arranged in the housing adjacent a periphery of the insert.

13. The invention of claim 11, wherein:

the housing has a recess therein which opens towards the cavity; and an insert of refractory material is received in the recess, the liner extending over said recess and covering a radial inner surface of the insert.

14. A rotary combustion engine with a housing defining a cavity therein, a rotor mounted for movement within the cavity, the housing having a bore extending through a radially outer peripheral portion thereof for receiving an element of a fuel injection and ignition system, and the housing having a plurality of cooling passages therein for receiving cooling fluid, the improvement wherein:

at least one group of the cooling passages comprises a plurality of spaced-apart drilled passages extending through a radially outer peripheral portion of the housing in a direction generally parallel to a rotation axis of the rotor, and the cooling passage of said group forming an array which extends generally parallel to an axis of the bore.

15. The invention of claim 14, wherein:

at least one other group of the coolant passages is arranged in an array which extends generally parallel to a running surface surrounding the cavity.

16. In a rotary combustion engine with a housing having cavity therein, the housing having a bore extending therethrough for receiving an element of a fuel injection and ignition system, the housing having a plurality of cooling passages therein for receiving cooling fluid, the improvement wherein:

at least one group of the cooling passages forms an array which extends generally parallel to an axis of the bore;

the housing has a recess formed in a top-dead-center region thereof, the recess opening towards the cavity;

an insert of refractory material is received in the recess; and a liner extends over said recess and covering a radial inner surface of the insert.

17. The invention of claim 16, wherein:

an insert bore extends through the insert, the insert bore receiving the element of the fuel injection and ignition system.

* * * * *